Figure 1:
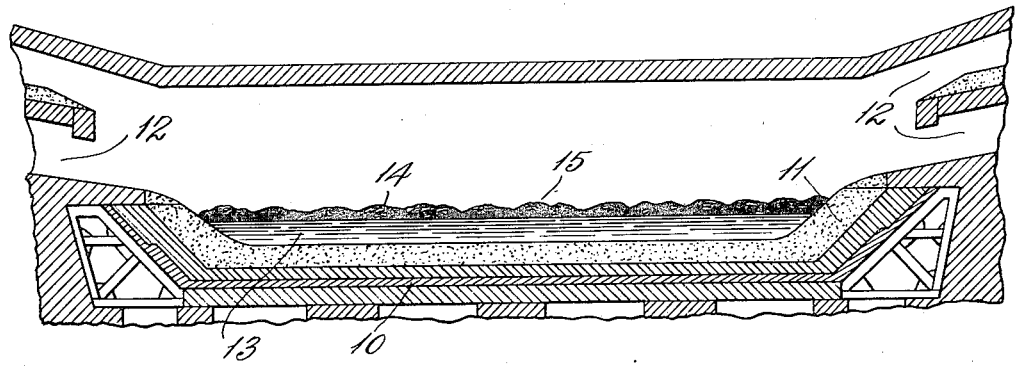

Oct. 23, 1923. 1,471,401

H. KOPPERS

PROCESS FOR DESULPHURIZATION OF IRON AND STEEL

Filed July 8, 1921

Inventor:
Heinrich Koppers
By- Munday, Clark & Carpenter
Attys.

Patented Oct. 23, 1923.

1,471,401

UNITED STATES PATENT OFFICE.

HEINRICH KOPPERS, OF ESSEN-RUHR, GERMANY, ASSIGNOR TO THE KOPPERS DEVELOPMENT CORPORATION, OF PITTSBURGH, PENNSYLVANIA, A CORPORATION OF PENNSYLVANIA.

PROCESS FOR DESULPHURIZATON OF IRON AND STEEL.

Application filed July 8, 1921. Serial No. 483,146.

*To all whom it may concern:*

Be it known that I, HEINRICH KOPPERS, assignor to The Koppers Development Corporation, a corporation of Pennsylvania, a citizen of Germany, residing in Essen-Ruhr, Germany, have invented a new and useful Improvement in Processes for Desulphurization of Iron and Steel, of which the following is a specification.

This invention relates to an improved process for the desulphurization of iron and steel in large quantities.

The main German application K. 67087 VI/18b relates to a process for the desulphurization of large iron and steel quantities, according to which the liquid iron, finely distributed, is made to pass through a layer of slag in which, by means of the constant immersion of carbon at a high temperature, a releasing of calcium (C in combination with alumina calcium slag yields $CaC_2$, Ca, Al, etc., and these substances have a deoxidizing effect) is brought about which causes the sulphur from the iron to combine to form calcium sulfide and the oxygen to form CaO. The calcium sulfide itself is in or under the slag, and is soluble in this but not in the metal itself, so that in this manner the complete removal of the sulphur and the oxygen can be brought about. (Compare "Stahl and Eisen," 1908, page 873.) For carrying out this process, a device is used which consists of a fire-proof receptacle in which, by means of siphonlike overflows uniform liquid levels are constantly maintained for the fluid iron, while, by means of a lid closing the vessel at the top and perforated after the manner of a sieve, the pressing-in of the coke pieces introduced into the slag is insured on the one hand, and as fine a distribution as possible is effected on the other hand for the liquid iron charged at the top, so that it is possible for the same to percolate through the slag in thin streams.

The present invention concerns an improved form of embodiment of the same idea which constitutes, both as regards the process and also more particularly with reference to the arrangement to be applied thereto, a valuable simplification, inasmuch as the process can be carried out, for instance, in an ordinary hearth oven. The deoxidizing and desulfurizing of the iron in the hearth oven has taken place heretofore by the use of deoxidizing agents, such as calcium carbide, ferromanganese, ferrosilicon, spiegeleisen, aluminum and similar expensive substances, to be introduced from the outside.

In this connection, while employing several hearth ovens or tilting hearth ovens, the operation is carried out by first eliminating, by means of oxidizing the iron bath, the impurities which can be removed in this manner; the bath thus prepared is transferred to another hearth oven, or the slag is discharged entirely and the bath provided with new slag of high lime content. By introducing the reducing substances, a deoxidizing and desulfurizing is then brought about.

When using calcium carbide, this remains floating in the slag, whereby the metal oxides in the same are reduced and the metal passes into the steel bath. Substances like ferrosilicon sink through the slag and are dissolved in the steel bath. Manganese, added as ferromanganese, also sinks down immediately through the slag and is dissolved in the bath, while existing sulphur goes into the slag partly as manganese sulfide. A reaction of the sulphur compounds with the lime of the slag cover does not take place to any appreciable extent, unless the presence of the silicon facilitates the reaction to CaS. As the practical final result of all these measures, aside from the necessity of the use of expensive deoxidizing agents, it must be stated that at all events a complete desulphurization in the hearth oven cannot be brought about, so much so that this task has already been pronounced impossible altogether in the literature on the subject (compare "Dichmann: Der basische Herdofenprozess," pages 126, 127).

In the electric furnace the sulphur is eliminated to the point of leaving only traces, an oxidizing effect being aimed at in the first place by means of the addition of oxides and the resultant slag then being replaced by a new basic slag. The deoxidizing takes place with ferrosilicon, while previously, for the purpose of increasing the carbon content, if necessary, petroleum coke, pieces of electrodes or other carbon are added, and the slag cover is covered with carbon or coke powder for the purpose of producing a neutral atmosphere. If the ferro-silicon is replaced by ferromanganese, a desulphurization is not obtained any more than is the case if the slag contains more than 2% of metal oxides.

By this invention, all that is aimed at, the same as according to the main application, is to release calcium through the medium of carbon dipping into the slag, the calcium combining with the sulphur and forming calcium sulfide. For that purpose, the iron bath, after being purified as usual from phosphorus, manganese, silicon, etc., is to be transferred, free from slag remnants, to the hearth oven, where a basic slag blanket is produced. The immersion of the carbon into this highly heated slag cover is effected by adding a specially prepared form of carbon whose specific gravity coincides substantially with that of the slag.

In addition to the transfer of the sulphur as calcium sulfide into the slag, there also takes place at the same time a combining of the still existing oxygen with calcium and then with the carbon which then passes away in gaseous form as carbon monoxide The calcium sulfide remains in the slag layer as long as a neutral atmosphere prevails above the latter. In this connection, the freedom from sulphur of the heating gas plays no part. It is true the slag will absorb sulphur from heating gas rich in sulphur, but this will not go to the iron because the slag is free from heavy metal oxides, principally ferrous oxide. The calcium eliminated from the slag by direct reduction floats inside of the slag or forms a layer between the iron and slag. For bringing about a better reaction between the iron and calcium, the iron bath in this connection can be agitated or caused to bubble by the usual means, so that all of its parts may reach the surface at one time or another. A high temperature is indispensable for the formation of the calcium from the CaO.

After the liquid bath has thus been rid of sulphur and oxygen, it is possible to supply to it, if alloying is the aim, the respective substances to be admixed, be they carbon, silicon, tungsten, chromium or the like. In order to avoid a burning of the carbon on the one hand, however, and its dissolution by carbonic acid with the resultant lowering in temperature on the other hand, the carbon must be rendered difficult of combustion. These two qualities of the higher specific gravity and the reduced combustibility can be obtained for coke by superheating it, which causes its cellular structure to become smaller or finer and its specific gravity to increase, while by expelling the last remnants of hydrogen its combustibility is also diminished. In place of such coke, carbon bricks or graphite can also be used. The carbon is best given the shape of bricks whose size is governed by the thickness of the slag layer which latter itself has to have a certain height. For that purpose coke is ground fine and pressed under high pressure and with a suitable binding agent, such as tar, so as to form bricks which are given a specific weight of about 1.8, thus becoming approximately as heavy as the slag itself. In order to increase the effective area or surface, without reducing the dimensions of the bricks, these can be provided with suitable perforations.

The entire process permits of the layer of slag serving for the desulphurization to be used over again at any time by always revivifying it. For that purpose, air is conducted over or through the slag cover, in which case the calcium sulfide burns up and forms sulfurous acid and the S passes off as $SO_2$ with the air. In this manner this impurity of the iron bath is discharged in gaseous form, while revivifying or regenerating the slag bath. Since in this connection, however, an oxidizing of the sulfide into sulfate may also take place and the latter would again form iron sulfide with the iron, the regeneration of the slag blanket is effected each time after running off the iron bath.

Figure 2:
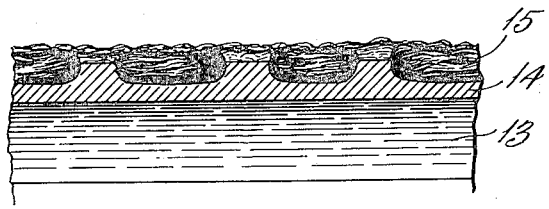
Figure 3:
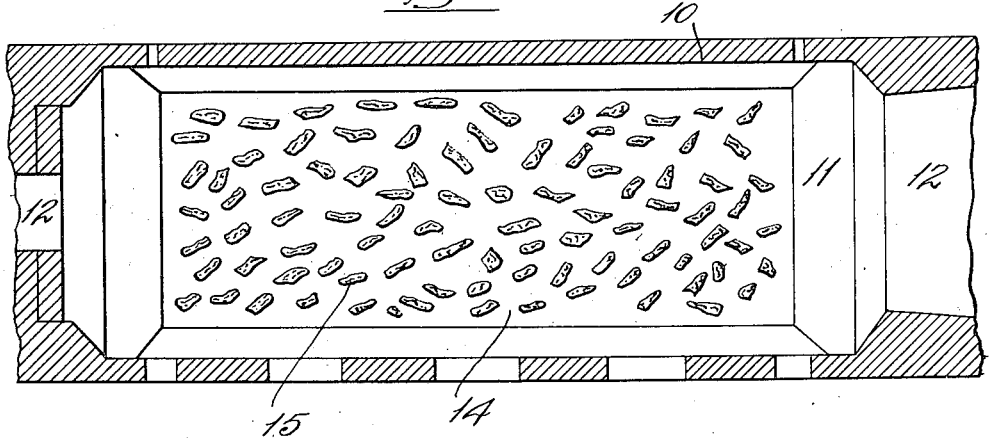

An arrangement suitable for carrying out the process described is reproduced in the drawings forming a part of this application, in which Fig. 1 is a longitudinal vertical section and Fig. 2 is a plan view of the hearth and iron bath and slag cover. Fig. 3 shows, on a larger scale, a partial section through the iron bath and the slag layer above the same.

The hearth oven 10, made in the well-known manner, is provided with the lining 11 and heated by means of the flues 12, and contains the iron bath 13, which supports the comparatively heavy slag layer 14. Into this slag layer 14 the coke or carbon pieces 15 are dipped in such a way that they just float in it. The spaces between the different coke pieces 15 can be filled by means of coke powder sprinkled into the slag layer so as to protect the surface of the latter.

The plan described has nothing to do with the practice, already mentioned, of covering the slag layer in electric furnaces for the purpose of avoiding oxidizing, since the operations herein described do not take place in that process. This, if for no other reason, is shown by the fact that here, too, such a covering of the surface with carbon powder is suitably used as an additional step for the same purpose. Only when working according to the instructions herein contained, is the calcium systematically released as the cheapest and most effective means for desulfurizing and deoxidizing.

What is claimed is—

1. A process for desulphurizing large quantities of iron and steel which consists in covering the bath, after the bath has been freed in the usual manner from phosphorous, manganese, silicon and the like and after removing the slag cover resulting after these elements have been freed, with a new, thick, highly basic slag into which specially prepared carbon of approximately the same specific gravity as the slag is dipped, for the purpose of combining with sulphur to form calcium suphide by releasing calcium under the influence of high temperatures and with a neutral atmosphere, thus removing at the same time the last traces of oxygen as carbon monoxide.

2. A process according to claim 1, characterized by a form of carbon being used which, owing to superheating, possesses a higher specific gravity and such low combustibility that both its combustion by air and its reduction to carbonic acid, with resultant lowering in temperature, are lessened and yet, in conjunction with the well-known surface covering of the slag layer by means of carbon powder, the requisite neutrality of the gas layer above the slag is obtained.

3. A process according to claims 1 and 2, characterized by the slag layer being regenerated at any time by passing air over or through it, in which connection the sulphur is discharged as sulfurous acid, while, in order to avoid a resulfurizing of the iron bath, the latter is first run off.

4. A process according to claim 2, characterized by the carbon being given the shape of bricks whose dimensions corresponds to the height of the slag layer and which are made of finely ground coke with a binding agent such as tar under high pressure in which connection, for the purpose of increasing the surface, the bricks can be provided with perforations.

5. A process for desulphurizing iron and steel, consisting in separating from each other the iron bath and its first slag cover, and then covering the bath with a basic slag containing calcium and pieces of densified carbon, and separating from the bath sulphur as calcium sulphide, and oxygen as carbon monoxide.

6. A process for desulphurizing iron and steel, consisting in separating from each other the iron bath and its first slag cover, and then covering the bath with a basic slag containing calcium and pieces of carbon of relatively high specific gravity and low combustibility, and with a carbon powder covering, and separating from the bath sulphur as calcium sulphide, and oxygen as carbon monoxide.

7. A process for desulphurizing iron and steel, consisting in separating from each other the iron bath and its first slag cover, and then covering the bath with a relatively heavy and thick basic slag containing calcium and pieces of densified carbon, and separating from the bath sulphur as calcium sulphide, and oxygen as carbon monoxide, and removing sulfurous acid from and revivifying said basic slag cover by the use of air, and re-using it for the same purpose.

8. A process for desulphurizing iron and steel, consisting in separating from each other the iron bath and its first slag cover, and then covering the bath with a basic slag containing calcium and perforated pieces of densified carbon made of finely ground coke and a binding agent under high pressure, and separating from the bath sulphur as calcium sulphide, and oxygen as carbon monoxide.

9. A process for desulphurizing iron and steel, consisting in separating from each other the iron bath and its first slag cover, and then covering the bath with a basic slag containing calcium and pieces of densified carbon, and separating from the bath sulphur as calcium sulphide, and oxygen as carbon monoxide, and adding alloying material to the metal in said bath.

HEINRICH KOPPERS.